United States Patent
Da Silva et al.

(10) Patent No.: US 11,196,473 B2
(45) Date of Patent: Dec. 7, 2021

(54) CELL QUALITY DERIVATION BASED ON FILTERED BEAM MEASUREMENTS

(71) Applicant: TELEFONAKTIEBOLAGET LM ERICSSON (PUBL), Stockholm (SE)

(72) Inventors: Icaro L. J. Da Silva, Solna (SE); Johan Rune, Lidingö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 126 days.

(21) Appl. No.: 16/603,571

(22) PCT Filed: Apr. 6, 2018

(86) PCT No.: PCT/IB2018/052411
§ 371 (c)(1),
(2) Date: Oct. 7, 2019

(87) PCT Pub. No.: WO2018/185726
PCT Pub. Date: Oct. 11, 2018

(65) Prior Publication Data
US 2020/0044708 A1    Feb. 6, 2020

Related U.S. Application Data

(60) Provisional application No. 62/482,524, filed on Apr. 6, 2017.

(51) Int. Cl.
*H04B 7/06* (2006.01)
*H04B 17/309* (2015.01)

(52) U.S. Cl.
CPC .......... *H04B 7/063* (2013.01); *H04B 7/0617* (2013.01); *H04B 7/0632* (2013.01); *H04B 17/309* (2015.01)

(58) Field of Classification Search
CPC .... H04B 7/063; H04B 17/309; H04B 7/0617; H04B 7/0632; H04B 7/0417; H04W 36/0085; H04W 72/087; H04W 72/046
See application file for complete search history.

(56) References Cited

U.S. PATENT DOCUMENTS

10,171,138 B2 * 1/2019 Turtinen ............... H04L 5/005
10,181,891 B2 * 1/2019 Islam ................... H04B 7/0814
(Continued)

OTHER PUBLICATIONS

Samsung, RRM Measurement in NR: The Details of Cell Quality Derivation, R2-1703722, 3GPP TSG RAN WG2 #97bis, Spokane, USA, Apr. 3-7, 2017 (Year: 2017).*

(Continued)

*Primary Examiner* — Lan-Huong Truong

(57) ABSTRACT

A method for deriving cell quality based on filtered beam measurements comprises detecting a first set of beamformed signals in a cell. The method further comprises determining a beam quality associated with each beamformed signal of the first set. The method further comprises identifying a first subset of beamformed signals. The first subset comprises the beamformed signals of the first set having a beam quality greater than a first threshold. The method further comprises initiating first beam level filters. Each first beam level filter is associated with a respective beamformed signal of the first subset of beamformed signals. The method further comprises generating filtered values for each beamformed signal of the first subset of beamformed signals.

18 Claims, 6 Drawing Sheets

(56) References Cited

U.S. PATENT DOCUMENTS

2016/0150435 A1    5/2016  Baek et al.
2017/0208494 A1*   7/2017  Moon .................. H04L 5/0048
2020/0022040 A1*   1/2020  Chen .................. H04W 56/001

OTHER PUBLICATIONS

Samsung, RRM Measurement in NR: The Details of Cell Quality Derivation, R2-1703722, 3GPP TSG RAN WG2 #97bis, Spokane, USA, Apr. 3-7, 2017.

Samsung, RRM Measurement in NR: The Details of Filtering, R2-1703721, 3GPP TSG RAN WG2 #97bis, Spokane, USA, Apr. 3-7, 2017.

Intel Corporation, Filter, serving cell quality and remaining issues in RRM, R2-1703417, 3GPP TSG RAN WG2 Meeting #97bis, Spokane, USA Apr. 3-7, 2017.

Ericsson, Filtering of connected mode RSs, R2-168729, 3GPP TSG-RAN WG2 Meeting#96, Reno, Nevada, USA, Nov. 14-18, 2016.

* cited by examiner

CELL QUALITY DERIVATION BASED ON FILTERED BEAM MEASUREMENTS

This application is a 371 of International Application No. PCT/IB2018/185726, filed Apr. 6, 2018, which claims the benefit of U.S. Application No. 62/482,524, filed Apr. 6, 2017, the disclosures of which are fully incorporated herein by reference.

TECHNICAL FIELD

The present disclosure relates, in general, to communication networks and, more particularly, to using filtered beam measurements to derive cell quality.

BACKGROUND

Measurement Model in LTE

In Long-Term Evolution (LTE), handover decisions at a serving network node (such as an evolved NodeB (eNB)) are taken based on events configured at a served wireless device (such as a user equipment (UE)) based on the radio quality of different cells. These measurements are performed based on cell-specific reference signals so that a cell quality is derived.

In LTE, the UE uses cell-specific reference signals (CRS) and synchronization signals (PSS/SSS) to identify a cell and perform radio resource management (RRM) measurements to derive a cell quality. It is crucial that the measurements are performed within a limited time, therefore for both intra- and inter-frequency measurements the wireless device, e.g., the UE, is expected to fulfill certain RRM requirements depending on channel conditions and noise levels. To do that the UE typically collects periodic snapshots (e.g. at every 40 ms) of CRS (after cell detection) and perform coherent and non-coherent averages per sample in a limited bandwidth. The UE performs filtering at the physical layer before reporting the measurement results to higher layers. Every time the higher layers receive a measurement result from the physical layer the UE can perform L3 filtering. In LTE, the standardized L3 filtering provides some level of harmonization among UEs. However, the parameters of the L1 filtering are not standardized and vary based on UE implementation.

The LTE filtering model, as captured in TS 36.300, is reproduced in FIG. 1. Point A may indicate a point in which measurements are taken (e.g., samples taken at the wireless device) that are internal to the physical layer. The wireless device may include Layer 1 (L1) filtering. Internal L1 filters may filter the inputs measured at point A. The exact L1 filtering applied is implementation dependent. Accordingly, how measurements are actually executed in the physical layer by an implementation (via inputs A and L1 filtering) are not constrained by the current standards.

At point B, measurements filtered by L1 filtering are reported to layer 3 (L3). L3 filtering is performed on the measurements provided at point B. Behavior of the L3 filters may be standardized and the configuration of the layer 3 filters may be provided by RRC signaling. L3 filtering may occur within the wireless device or may occur outside the wireless device, such as at another network node. A filtering reporting period at point C after L3 filtering may equal a single measurement period at point B.

At point C, measurements are provided after processing in the L3 filter(s). The reporting rate at point C may be identical to the reporting rate at point B. The measurements provided at point C may be used as input for one or more evaluation of reporting criteria.

The filtering model may also include an evaluation of reporting criteria. This evaluation may check whether actual measurement reporting is necessary at point D. The evaluation can be based on more than one flow of measurements at reference point C, e.g., to compare between different measurements. For example, there can be two measurements illustrated by input C and C'. The UE can evaluate the reporting criteria at least every time a new measurement result is reported at point C, C'. The reporting criteria may be standardized, and the configuration may be provided by RRC signaling (e.g., UE measurements). After evaluation, if reporting is necessary or otherwise authorized, a message including measurement report information may be sent on the radio interface.

L1 filtering may introduce a certain level of measurement averaging. How and when the UE exactly performs the required measurements may be implementation specific to the point that the output at B fulfils the corresponding requirements specified, e.g., in 3GPP TS 36.133. L3 filtering and the parameters used are specified by RAN2 in TS 36.331 and do not introduce any delay in the sample availability between B and C. Measurements at point C, C' may be the input used in the event evaluation.

Also, at every sample (e.g., of 40 ms) the higher layers at the UE will have available one or multiple cell-specific reference signal received power (RSRP) (and/or reference signal received quality (RSRQ)) that can be used to trigger measurement reports (in the case the UE is in RRC_CONNECTED).

NR Cell and Beamforming

The so-called 5G system, from a radio perspective started to be standardized in 3GPP and the so-called New Radio (NR) refers to the radio interface. One of the characteristics of 5G and/or NR is the frequency range going to higher frequencies than LTE where more challenging propagation conditions exist, such as a higher penetration loss. To mitigate some of these effects, multi-antenna technologies such as beamforming are likely to be implemented widely.

Hence, while in LTE a UE discovers a cell and perform RRM measurements based on signals transmitted in an omnidirectional or cell-wide (a.k.a. sectored) manner (i.e. PSS/SSS/CRS), in NR, the UE should be able to perform cell discovery and RRM measurements on signals that can be beamformed.

The current agreements in RAN1 show that to cope with beamforming, NR will define a signal structure to carry synchronization signals for cell discovery and RRM measurements for RRC_IDLE and RRC_CONNECTED UEs. In RRC_CONNECTED, additional reference signals (such as CSI-RS) can also be used. That signal structure is called Synchronization Signals (SS) Block Set.

Herein we describe a non-limiting example of SS block and SS burst configuration which may be assumed in other embodiments. FIG. 2 illustrates an example configuration of SS blocks, SS bursts, and SS burst sets/series.

SS Block: New Radio Primary Synchronization Signal (NR-PSS), New Radio Secondary Synchronization Signal (NR-SSS) and/or New Radio Physical Broadcast Channel (NR-PBCH) can be transmitted within an SS block. For a given frequency band, an SS block corresponds to N Orthogonal Frequency Division Multiplexing (OFDM) symbols based on the default subcarrier spacing, and N is a constant. UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE. The position(s) of actual transmitted SS-blocks can be informed for helping CONNECTED/IDLE mode measurement, for helping CONNECTED mode UE to receive DL data/control in unused SS-blocks and potentially for helping IDLE mode UE to receive DL data/control in unused SS-blocks.

SS Burst: One or multiple SS block(s) compose an SS burst. The maximum number of SS-blocks, L, within SS burst set may be carrier frequency dependent, e.g.:

For frequency range category #A (e.g., 0~6 GHz), the number (L) is TBD within $L \leq [16]$ For frequency range category #B (e.g., 6~60 GHz), the number is TBD within $L \leq [128]$ SS burst set: One or multiple SS burst(s) further compose an SS burst set (or series) where the number of SS bursts within a SS burst set is finite. From physical layer specification perspective, at least one periodicity of SS burst set is supported. From UE perspective, SS burst set transmission is periodic. At least for initial cell selection, UE may assume a default periodicity of SS burst set transmission for a given carrier frequency (e.g., one of 5 ms, 10 ms, 20 ms, 40 ms, 80 ms, or 160 ms). UE may assume that a given SS block is repeated with a SS burst set periodicity. By default, the UE may neither assume the gNB transmits the same number of physical beam(s), nor the same physical beam(s) across different SS-blocks within an SS burst set. For each carrier, the SS blocks may be time-aligned or overlap fully or at least in part, or the beginning of the SS blocks may be time-aligned (e.g., when the actual number of transmitted SS blocks is different in different cells).

Differently from LTE, the physical signals (e.g., reference signals and synchronizations signals) used for cell discovery and RRM measurements in NR should be beamformed. In LTE the UE keeps track of the quality of cells (serving and neighbors) for different purposes, e.g.:

Radio Link Monitoring: UE tracks the quality of its serving cell, so it can detect out-of-sync events and in-sync events that may later trigger radio link failure procedures;

Mobility: UE tracks the quality of neighbor cells to identify a handover candidate in a timely manner, e.g., before losing the network connection;

CA configuration: UE tracks the quality of intra-frequency and inter-frequency neighbor cells in order to be get in a timely manner a suitable CA configuration (e.g., a set of serving carriers and serving cells such as PSCC and PSCell, SCCs and SCells);

Power control: UE performs serving cells measurements to be able to perform power control;

Link adaptation: UE performs serving cells measurements to be able to adapt to the link quality.

Cell level quality measurements will also be needed in NR at least for similar purposes. Current discussions regarding NR and other next generation communications systems may include solutions where the cell quality is based on filtered beam level quality measurements.

SUMMARY

According to certain embodiments, a method for deriving cell quality based on filtered beam measurements comprises detecting a first set of beamformed signals in a cell. The method further comprises determining a beam quality associated with each beamformed signal of the first set. The method further comprises identifying a first subset of beamformed signals. The first subset comprises the beamformed signals of the first set having a beam quality greater than a first threshold. The method further comprises initiating first beam level filters. Each first beam level filter is associated with a respective beamformed signal of the first subset of beamformed signals. The method further comprises generating filtered values for each beamformed signal of the first subset of beamformed signals.

According to certain embodiments, a wireless device comprises one or more interfaces, memory, and processing circuitry. The processing circuitry is configured to execute instructions stored in the memory, whereby the wireless device is configured to detect a first set of beamformed signals in a cell. The wireless device is further configured to determine a beam quality associated with each beamformed signal of the first set. The wireless device is further configured to identify a first subset of beamformed signals. The first subset comprises the beamformed signals of the first set having a beam quality greater than a first threshold. The wireless device is further configured to initiate first beam level filters. Each first beam level filter is associated with a respective beamformed signal of the first subset of beamformed signals. The wireless device is further configured to generate filtered values for each beamformed signal of the first subset of beamformed signals.

According to certain embodiments, a computer program product comprises a non-transitory computer readable storage medium storing computer readable program code, the computer readable program comprises program code for detecting a first set of beamformed signals in a cell. The computer readable program further comprises program code for determining a beam quality associated with each beamformed signal of the first set. The computer readable program further comprises program code for identifying a first subset of beamformed signals. The first subset comprising the beamformed signals of the first set having a beam quality greater than a first threshold. The computer readable program further comprises program code for initiating first beam level filters. Each first beam level filter is associated with a respective beamformed signal of the first subset of beamformed signals. The computer readable program further comprises program code for generating filtered values for each beamformed signal of the first subset of beamformed signals.

Each of the embodiments of the method, computer program product, and wireless device may include one or more of the following features:

In certain embodiments, the method/computer program product/wireless device further comprises detecting a second set of beamformed signals in the cell and determining a beam quality associated with each beamformed signal of the second set. The method/computer program product/wireless device further comprises identifying a second subset of beamformed signals. The second subset comprising the beamformed signals of the second set having a beam quality greater than the first threshold. The method/computer program product/wireless device further comprises initiating second beam level filters. Each second each beam level filter is associated with a respective beamformed signal of the second subset of beamformed signals. The method/computer program product/wireless device further comprises generating filtered values for each beamformed signal of the second subset of beamformed signals.

In certain embodiments, initiating first beam level filters comprises initiating a number of beam level filters equal to or less than a predetermined maximum number of beams to derive a cell quality for the cell.

In certain embodiments, if a number of beamformed signals in the first subset is greater than or equal to a predetermined maximum number of beams to derive a cell quality for the cell, initiating the first beam level filters comprises initiating a number of beam level filters equal to the predetermined number of beams.

In certain embodiments, if a number of beamformed signals in the first subset is less than a predetermined maximum number of beams to derive a cell quality for the cell, initiating the first beam level filters comprises initiating a number of beam level filters equal to the number of beamformed signals in the first subset.

In certain embodiments, the method/computer program product/wireless device further comprises determining the cell quality of the cell based on at least the filtered values of the beamformed signals of the first subset of beamformed signals.

In certain embodiments, the method/computer program product/wireless device further comprises transmitting (735) the determined cell quality to a network node.

In certain embodiments, determining the cell quality of the cell is further based on the filtered values of the beamformed signals of the second subset of beamformed signals.

In certain embodiments, a number of beamformed signals in the second set of beamformed signals in the cell is less than a number of beamformed signals in the first set of beamformed signals in the cell.

In certain embodiments, a number of beamformed signals in the second set of beamformed signals is the same as a number beamformed signals contained in the first set of beamformed signals.

In certain embodiments, the second set of beamformed signals contains a greater number of beamformed signals than the first set of beamformed signals.

In certain embodiments, the first set of beamformed signals contains a beamformed signal not contained within the second set of beamformed signals or the second set of beamformed signals contains a beamformed signal not contained within the first set of beamformed signals.

In certain embodiments, the second set of beamformed signals contains a beamformed signal that is the same as a beamformed signal in the first set of beamformed signals.

In certain embodiments, the method/computer program product/wireless device further comprises ranking the first set of beamformed signals. In some embodiments, ranking the first set of beamformed signals comprises determining a beam quality of each beamformed signal of the first set of beamformed signals. Ranking the first set of beamformed signals further comprises ordering the first set of beamformed signals based on the respective beam qualities.

In certain embodiments, the method/computer program product/wireless device further comprises ranking the second set of beamformed signals. In some embodiments, ranking the second set of beamformed signals comprises determining a beam quality of each beamformed signal of the second set of beamformed signals. Ranking the second set of beamformed signals comprises ordering the second set of beamformed signals based on the respective beam qualities.

In certain embodiments, the method/computer program product/wireless device further comprises determining that a first beamformed signal contained within the first set is not present in the second set. The method/computer program product/wireless device further comprises assigning a predetermined quality value to the first beamformed signal.

In certain embodiments, generating filtered values for each beamformed signal of the first subset of beamformed signals comprises applying a weighting factor to each of the generated filtered values.

In certain embodiments, generating filtered values for each beamformed signal of the second subset of beamformed signals comprises applying a weighting factor to each of the generated filtered values.

In certain embodiments, wherein applying a weighting factor to each of the generated filtered values comprises applying a larger weighting factor for more recent beamformed signals.

In certain embodiments, the second set of beamformed signals are detected after the first set of beamformed signals. Larger weighting factors are applied to the generated filtered values for each beamformed signal of the second subset of beamformed signals than the respective weighting factors applied to the generated filtered values for each beamformed signal of the first subset of beamformed signals.

According to certain embodiments, a method in a network node communicatively coupled to a wireless device comprises signaling one or more rules to the wireless device. The one or more rules indicate how to generate filtered values for each beamformed signal detected in a cell using beam level filters at the wireless device. The method further comprises receiving a cell quality measurement that the wireless device performs based on generated filtered values for each beamformed signal detected in the cell. The method further comprises performing an operation based on the received measurement.

According to certain embodiments, a network node comprises one or more interfaces, memory, and processing circuitry. The processing circuitry is configured to execute instructions stored in the memory, whereby the network node is configured to signal one or more rules to the wireless device. The one or more rules indicating how to generate filtered values for each beamformed signal detected in a cell using beam level filters at the wireless device. The network node is further configured to receive a cell quality measurement that the wireless device performs based on generated filtered values for each beamformed signal detected in the cell. The network node is further configured to perform an operation based on the received measurement.

According to certain embodiments, a computer program product comprises a non-transitory computer readable storage medium storing computer readable program code. The computer readable program comprises program code for signaling one or more rules to the wireless device. The one or more rules indicating how to generate filtered values for each beamformed signal detected in a cell using beam level filters at the wireless device. The computer readable program further comprises program code for receiving a cell quality measurement that the wireless device performs based on generated filtered values for each beamformed signal detected in the cell. The computer readable program further comprises program code for performing an operation based on the received measurement.

Each of the embodiments of the method, computer program product, and network node may include one or more of the following features:

In certain embodiments, the one or more rules are configured to cause the wireless device to perform any of the methods in a wireless device described above.

In certain embodiments, the method/computer program product/network node further comprises obtaining information of the beam-level filtering capabilities available at the wireless device. The one or more rules signaled to the wireless device are based on the obtained information.

In certain embodiments, the one or more rules signaled to the wireless device are based on the beamform signals being transmitted in the cell.

Certain embodiments of the present disclosure may provide one or more technical advantages. For example, certain embodiments allow a wireless device to determine a cell quality of a cell based on beam-level measurements. For example, the wireless device may generate filtered values of detected beams at the wireless device and use those values to derive a cell quality of the cell. As another example, certain embodiment allow a wireless device to detect multiple sets of beamformed signals, e.g., at different times, and use filtered values from the multiple sets of beamformed signals to determine the cell quality. As yet another example, certain embodiments of a wireless device are provided with the capability to rank detected beamformed signals to determine which beams to use in deriving cell quality. In this manner, only the best beams are used in deriving cell quality, reducing the effects of outlier beams degrading the cell quality if there are sufficient good beams to support the wireless device. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Beam-level quality measurements, such as RSRP/RSRQ, for a given cell should be supported in NR to enhance measurement reports and select or track beams for access to the network. In LTE, where only cell-level measurements are required, filtering is maintained per detected cell. For every sample, the UE is required to detect and maintain measurements for at least a certain number of cells. In LTE, these signals for RRM measurements and cell discovery are not beamformed (in contrast to NR) and it is very likely that over the periods across the samples, e.g., 40 ms, there will be few changes in terms of number of cells and/or the cells that are being detected and filtered. Hence, the UE can easily update its list of filters per cell. However, NR introduces unsolved problems.

Figure 1:
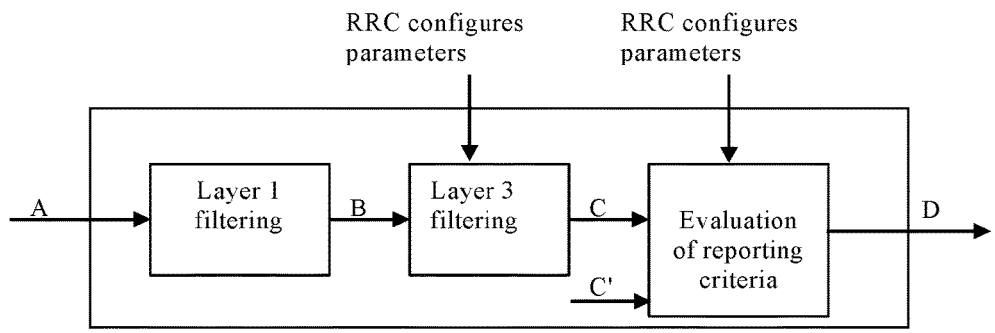
FIG. 1 illustrates an example measurement model including measurement filtering, in accordance with certain embodiments.
Figure 2:
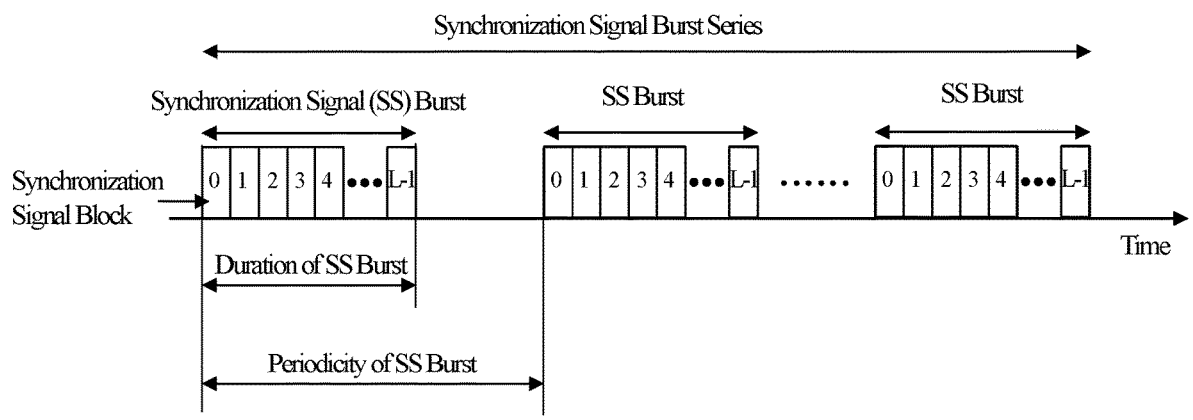
FIG. 2 illustrates an example configuration of SS blocks, SS bursts, and SS burst sets/series, in accordance with certain embodiments.
Figure 3:
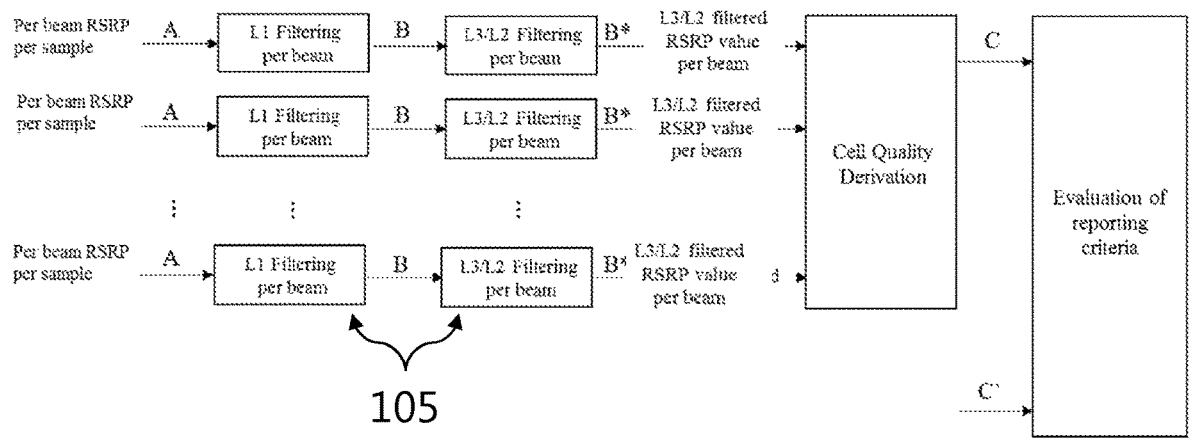
FIG. 3 illustrates an example measurement model supporting beam-level filtering, in accordance with certain embodiments.

For example, in NR, the wireless devices (e.g., UEs) will likely be required to filter RSRP measurements per beam per cell. In other words, in addition to cell level filters, the UE may be required to maintain beam-level filters. Potential measurement models have been discussed in RAN2, mainly in terms of which layer should configure these filters (L1, L2 or L3) and/or whether these should be standardized or not and/or whether cell quality derivation should occur before or after the beam level filtering. For example, FIG. 3 illustrates an example measurement model supporting beam-level filtering, in accordance with certain embodiments. In contrast with FIG. 1, FIG. 3 illustrates receiving per beam RSRP per sample at a plurality of measurement points A. The measurement model also illustrates beam-level filters 105 that may be implemented as L1 beam-level filters or L3/L2 beam level filters. Each of beam-level filters 105 may filter the per beam RSRP per sample. After beam-level filtering, each of the filtered values may be used to derive a cell quality. For example, the values at B* may be all of the filtered values of the individual beams from a single cell. Each of the B* values may be combined together to derive a cell quality. Then, similarly to FIG. 1, the model may include an evaluation of reporting criteria before reporting the cell quality.

Beam-level measurements in NR give rise to several problems However, differently from LTE, some additional problems have been identified in NR:

1) The number and the set of detected beams per cell can change quite a lot from one sample to another;
2) The beams detected per cell (and their ranking) can change quite a lot, even if the number of detected beams remains the same;
3) The UE has limited resources in terms of filters overall, for all the cells it should perform measurements, including neighbor and serving cells. Hence, problems 1) and 2) occurring per cell, creates an additional problem and complexity issues in the UE in selecting which beam-filters to maintain per cell and how many, in that limited resource scenario.

Figure 4:
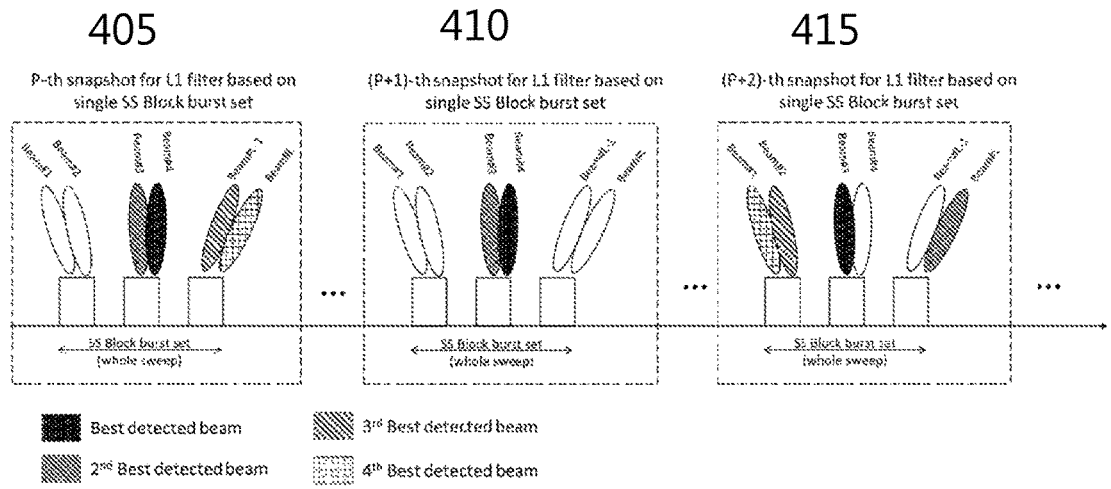
FIG. 4 illustrates a series of beam-level snapshots in a SS block burst set, in accordance with certain embodiments.

The first two problems can be illustrated with the following example. FIG. 4 illustrates a series of beam-level snapshots taken at a wireless device, in accordance with certain embodiments. At the P-th snapshot 405 the UE may detect beams #4, #3, #L−1 and #L, ordered from the strongest to the weakest. These could be beams above a certain threshold, which could be configured by the network. In the (P+1)-th snapshot 410 the UE may detect fewer beams, e.g., only #4, #3 and beams #L−1 and #L not being detected. In the (P+2)-th snapshot 415 beams #3, #L, #2, #1 may be detected. Accordingly, not only can the number of beams change from one sample to another, but beams not previously detected may be detected and the number of beams detected from snapshot to snapshot may increase. In a worst case scenario, the number of beams detected per cell can be different for every sample and always increase with each sample. The third problem arises when the number of beams and the beams detected varies in each cell that the UE detects in a snapshot, e.g., in the case of neighbor cells. If the UE detects beams for more than one cell, the number of beams is per cell per sample. Thus, the complications may be compounded exponentially as the number of cells increases.

It is proposed herein to solve the previously described problem with the UE processing beam measurement samples per cell and updating its beam-level filters to compute a cell quality measurement (e.g. RSRP) based on a number N best out of "good" beams. Whether a beam is "good" is defined by an optional quality threshold, i.e. the beam is "good" if its measured quality exceeds the threshold (the value at which such a threshold might be set is still being studied in 3GPP). Absence of the threshold is in practice equivalent to saying that the threshold is that the beam must be detectable, i.e. a beam that cannot be detected cannot be part of the set of considered beams, so the number of beams used in the cell quality derivation is still up to N beams but possibly fewer. Updating the UE's beam-level filters is done by adding, removing, and/or replacing the filtered beam level quality values (e.g. RSRP) before computing the cell level quality measurement as a combination of the best N filtered beam level measurements.

The embodiments disclosed herein enable the UE to perform filtered beam-level quality measurements (e.g. RSRP/RSRQ) in an efficient way considering that the UE has limited resources in terms of filter capabilities and accounting for the fact that the number and the set of detectable beams in a cell may change rather frequently. Embodiments herein cover how the UE should add and/or remove and/or replace beam-level filters used to compute cell quality level. The UE can either implement these rules or receive them from the network.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M) or machine to human communication, a sensor equipped with UE, iPAD, Tablet, mobile terminals, smart phone, laptop embedded equipment (LEE), laptop mounted equipment (LME), USB dongles, Customer Premises Equipment (CPE), etc.

Also, in some embodiments generic terminology "network node", is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell on the primary carrier is interchangeably called as primary cell (PCell) or primary serving cell (PSC). Similarly, the secondary serving cell, i.e. the serving cell on the secondary carrier, is interchangeably called as secondary cell (SCell) or secondary serving cell (SSC).

The term "signalling" used herein may comprise any of: high-layer signalling (e.g., via RRC or a like), lower-layer signalling (e.g., via a physical control channel or a broadcast channel), or a combination thereof. The signalling may be implicit or explicit. The signalling may further be unicast, multicast or broadcast. The signalling may also be directly to another node or via a third node. Hence, signalling could take place between a network node and a UE or between two network nodes or multi-hop across multiple network nodes, potentially involving also a UE. The term signalling may also comprise signalling on layers below RRC, such as MAC signalling or L1 /L2 signalling.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, CA, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, radio link monitoring (RLM), system information (SI) reading, etc.

The term measurement performance used herein may refer to any criteria or metric which characterizes the performance of the measurement performed by a radio node. The term measurement performance is also referred to as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g. ideal measurement result) etc. Examples of measurement time are measurement period, cell identification period, evaluation period, etc.

The embodiments disclosed herein may be applied for beam quality measurements and cell quality derivation by a UE in RRC_CONNECTED, RRC_INACTIVE state or RRC_IDLE state. For a UE in RRC_CONNECTED state the measurements may be performed for the purpose of assessing the need for handover between cells, selection of target cell in case of handover and/or selection of a certain beam in the target cell. For a UE in RRC_INACTIVE state or RRC_IDLE state the measurements may be performed for the purpose of assessing the need for cell re-selection, i.e. assessing whether the UE should start camping on (i.e. monitor relevant control channels of) a new cell. Furthermore, the embodiment may be applied in conjunction with measurements performed to support/enable certain features/mechanisms such as radio link monitoring, mobility, CA configuration, power control and link adaptation.

Certain embodiments of the present disclosure provide solutions to how a wireless device, e.g., a UE, handles the filters per beam to compute cell quality. For a given cell, let us assume that N is the parameter defining the maximum number of beams used to derive the cell quality. Note that the beam quality measurement samples may be linear values, e.g. measured in W (watts) or logarithmic values, e.g., measured in dBm or dB in relation to some other reference. A suitable such reference could be a threshold which the beam quality must exceed to be considered for inclusion in the beam filtering process. In the examples herein, the measurement samples are assumed to be either linear or logarithmic measured in dB in relation to a lowest acceptable beam quality level for inclusion in the beam filtering process. In either case, the poorest quality a beam measurement sample can have (or be assigned) in the beam filtering process is 0 (zero) (e.g. either 0 W or 0 dB).

As an example, let us assume that the number of (best) beams to be considered in the cell quality derivation, N=3. For example, the wireless device can use the measurements of three beams in the cell to determine its quality.

For the first sample, the wireless device detects the following best beams Reference Signal Received Powers (RSRPs):
P=1→ beam #5-rsrp(1)>beam #8-rsrp(1)>beam #2-rsrp (1);
Then, the wireless device may initiate 3 beam-level filters and starts to track these 3 beams. If at the second sample, a lower number of beams are detected, the wireless device may detect the following best beams RSRPs:
P=2→ beam #5-rsrp(2)>beam #8-rsrp(2);
Then, the wireless device may generate the first filtered values (where x1 and x2 are filtering weights):
Filtered-beam #5-rsrp(2)=x1*beam #5-rsrp(1)+x2*beam #5-rsrp(2);
Filtered-beam #8-rsrp(2)=x1*beam #8-rsrp(1)+x2*beam #8-rsrp(2);
Filtered-beam #2-rsrp(2)=x1*beam #2-rsrp(1)+x2*0;
For missing samples, such as in the above mentioned example, the wireless device may simply assume a value 0 (e.g. no received power or the lowest quality acceptable for a beam in the beam filtering process) and, if at the end of the measurement window that filtered value goes below a pre-defined minimum threshold the network may discard the beam from the beams being tracked, except if that is the only best beam of that cell. For example, the network may ensure that at least one beam of the cell is tracked, even if it is below the pre-defined minimum threshold.

If at the second sample, a higher number of beams are detected, the wireless device may detect the following best beams RSRPs:
P=2→ beam #5-rsrp(2)>beam #8-rsrp(2)>beam #2-rsrp (2)>beam #7-rsrp(2);
Then the wireless device may generate the first filtered values:
Filtered-beam #5-rsrp(2)=x1*beam #5-rsrp(1)+x2*beam #5-rsrp(2);
Filtered-beam #8-rsrp(2)=x1*beam #8-rsrp(1)+x2*beam #8-rsrp(2);
Filtered-beam #2-rsrp(2)=x1*beam #2-rsrp(1)+x2*beam #2-rsrp(2);
Filtered-beam #7-rsrp(2)=x2*beam #7-rsrp(2)
In certain embodiments, if a new beam is detected as useful, e.g., above a certain threshold or otherwise being of use in determining cell quality, a new filter may be initiated, and, at every filtered sample, the wireless device may check whether the filtered values is still above the "good" beam threshold for filtered values, which could be different than a threshold for unfiltered value. For example, the wireless device may have configured a first threshold for an unfiltered value, e.g., whether to add a newly detected beam to the track beams and initiate a beam filter for the new beam, and may have configured a second threshold for filtered values, e.g., whether to keep tracking a previously tracked beam and keep the beam filter associated with that tracked beam. The thresholds may be different, or alternatively the same. In certain embodiments, the thresholds are configured by the wireless device. In other embodiments, the thresholds are configured by the network. In some embodiments, the thresholds are configured by both the wireless device and the network. For example, the first threshold may be configured by UE-implementation while the second threshold may be signaled by the network e.g. via RRC dedicated signalling, broadcasted over system information, a specific MAC Control Element (MAC CE) or a combination of these.

In certain embodiments, if a sample appears for a new beam (i.e. without an existing filtered value yet), and its filtered value is "good", e.g., it meets certain criteria such as a threshold power or quality, the wireless device may update its tracked beams to filter and consider which N filtered beam values to keep if the number of filtered beams exceeds N. For example, in the example above, there would be 4 beams above the threshold, but if N=3 and the new sample changes the order so that:
Filtered-beam #5-rsrp(2)>Filtered-beam #8-rsrp(2)>Filtered-beam #7-rsrp(2)>Filtered-beam #2-rsrp(2) But since N=3, the wireless device may update which filters for the cell are maintained:
Filtered-beam #5-rsrp(2)>Filtered-beam #8-rsrp(2)>Filtered-beam #7-rsrp(2)
If, however, the newly beam(s) are "good" and the UE has filtered values for a number of beams lower than N, the wireless device may just increment and keep the additional filter. For example, consider the previous example, but in the case where N=4. In this example, the wireless device may keep the three previous values, but also include the newly detected fourth value:
Filtered-beam #5-rsrp(2)>Filtered-beam #8-rsrp(2)>Filtered-beam #7-rsrp(2)>Filtered-beam #2-rsrp(2)
As shown in the examples above, if new beams samples appear the wireless device can initiate a new filter if the number of filtered good beams are still below the maximum value. If not, the wireless device may perform beam quality ranking and keep the N best beams after the filtering. In this manner, the wireless device can control the use of the beam-level filters available at the wireless device while still allowing a sufficient number of filtered values to be maintained to derive an accurate cell quality.

In certain embodiments, once the per beam filtered values are generated, at the end of a predefined interval, e.g. 40 ms, the wireless device may compute the cell quality based on the N filtered beams, e.g. as an average calculation of the filtered beam quality values. As a result, the wireless device may dynamically determine a cell quality using beam-level filtering.

Certain embodiments of the present disclosure address how to maximize the use of the available beam-level filters at the wireless device. For example, consider the number N as the (maximum) number of (best) beams to be used in the cell quality derivation calculation and K as the number of beam filters the wireless device can maintain in parallel, e.g. the number of implemented beam filters. (If less than N beams can be detected or less than N beams exceeds a minimum quality threshold for inclusion in the cell quality derivation calculation, then fewer than N beams may be used in the cell quality derivation calculation, e.g., only X beams which are detectable or whose quality exceeds a minimum quality threshold and where X<N may be used in the cell quality derivation)

In certain embodiments, the wireless device does not discard any intermediate filtered values, unless it is forced to, due to limitations in the wireless device. For example, the wireless device may maintain filtered values for the maximum number of parallel beam filters the wireless device can maintain. In some embodiments, the wireless device may discard an intermediate filtered value if it goes below a certain quality threshold, but not just because the number of maintained intermediate filtered values exceeds the number of beams to be used to derive the cell quality, e.g., N.

In certain embodiments, K is greater than N. The wireless device may keep all filtered beam values it produces even if this number exceeds N, as long as it does not exceed K. For example, the wireless device may maintain up to K beam filters in parallel. In some embodiments, the number of detected beams with qualities making them qualified to be part of the beam filtering process exceeds K. In these embodiments, the wireless device may rank the beams (e.g., their intermediate beam filter values) and keep filters for the K best beams. At the end of the filtering process, the wireless device may select the best N filtered values (or fewer if less than N filtered values have been tracked) to form the basis for cell quality derivation calculation (e.g., as an average calculation of the (up to) N filtered values.

In certain embodiments, the wireless device may apply a quality threshold for intermediate beam filter values, where an intermediate beam filter value is discarded (and the wireless device stops tracking the beam in the filtering process), if the intermediate beam filter value goes below the threshold. The threshold may be a predetermined threshold. In some embodiments, the threshold is configured by the wireless device. In some embodiments, the threshold is configured by the network, e.g., signaled to the wireless device. In some embodiments, the threshold is a dynamically determined threshold based on the wireless communication environment of the wireless device and/or the network environment.

In certain embodiments, the wireless device does not apply any quality threshold for intermediate beam filter values and does not discard any intermediate filtered values, unless the number of intermediate beam filter values to be maintained in parallel exceeds K. An advantage of not applying the quality threshold is that if the concerned beam reappears at subsequent sample occasions, its earlier intermediate filter value can be used together with the new sample in a continued filtering process. For example, even if the wireless device does not detect a certain tracked beam at a measurement instance, but the wireless device may still maintain the earlier filtered value. The wireless device may then, in the next measurement instance, detect the tracked beam and measure another filtered value. By keeping the intermediate filtered value, the subsequent filtered value may be combined, e.g., as an average or using certain weighting factors, with the previous values for use in deriving cell quality.

In certain embodiments, the number of filters that the wireless is capable of maintaining in parallel exceeds the maximum number of beams that the wireless device is capable of detecting. For the purposes of an example, consider the case where K is infinite (K=∞), i.e., the number of beam filters the wireless device maintains in parallel is not limited. If the wireless device, in addition, does not apply any quality threshold for intermediate beam filter values, the wireless device may collect and maintain beam filters and intermediate beam filter values for all beams it detects which fulfill the criteria for being included in the beam filtering process, until the beam filtering process is finished. At that point, as before, the wireless device may select the N best of the filtered values (or fewer than N if less than N beam filter values have been produced) to form the basis for the cell quality derivation calculation.

In certain embodiments, filtering weights or weighting factors may be applied to the filtered values, such as those described above. The filtering weights, e.g., the weight factors by which the beam measurement samples are multiplied in the filtering process ($x1, x2 \ldots$), may be selected in a way that makes newer beam measurement samples greater impact on the final filtered valued than older samples. For instance, the weights can be selected so that $x1 < x2 < \ldots$ or $x1 \leq x2 \leq \ldots$. In other words, subsequent filtered values may factor in more prominently into the filtered values for a beam. Thus, larger weighting factors may be applied to filtered values obtained from beamformed signals detected later in time than the weighting factors applied to filtered values obtained from beamformed signals detected earlier.

Figure 5:
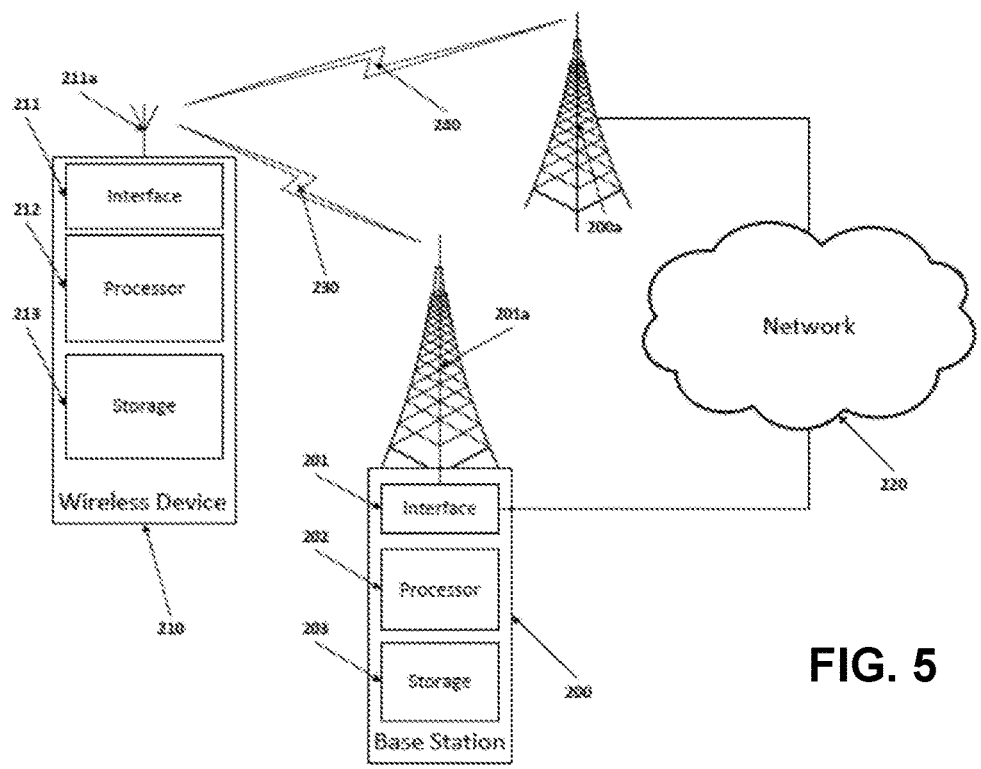
FIG. 5 is a block schematic illustrating an example network, in accordance with certain embodiments.

Although the solutions described above may be implemented in any appropriate type of system using any suitable components, particular embodiments of the described solutions may be implemented in a wireless network such as the example wireless communication network illustrated in FIG. 5. In the example embodiment of FIG. 5, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 5 illustrates a wireless network comprising a more detailed view of network node 200 and wireless device (WD) 210, in accordance with a particular embodiment. For simplicity, FIG. 5 only depicts network 220, network nodes 200 and 200a, and WD 210. Network node 200 comprises processing circuitry (e.g., which may include one or more processors 202), storage 203, interface 201, and antenna 201a. Similarly, WD 210 comprises processing circuitry (e.g., which may include one or more processors 212), storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 5, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 5, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 6:
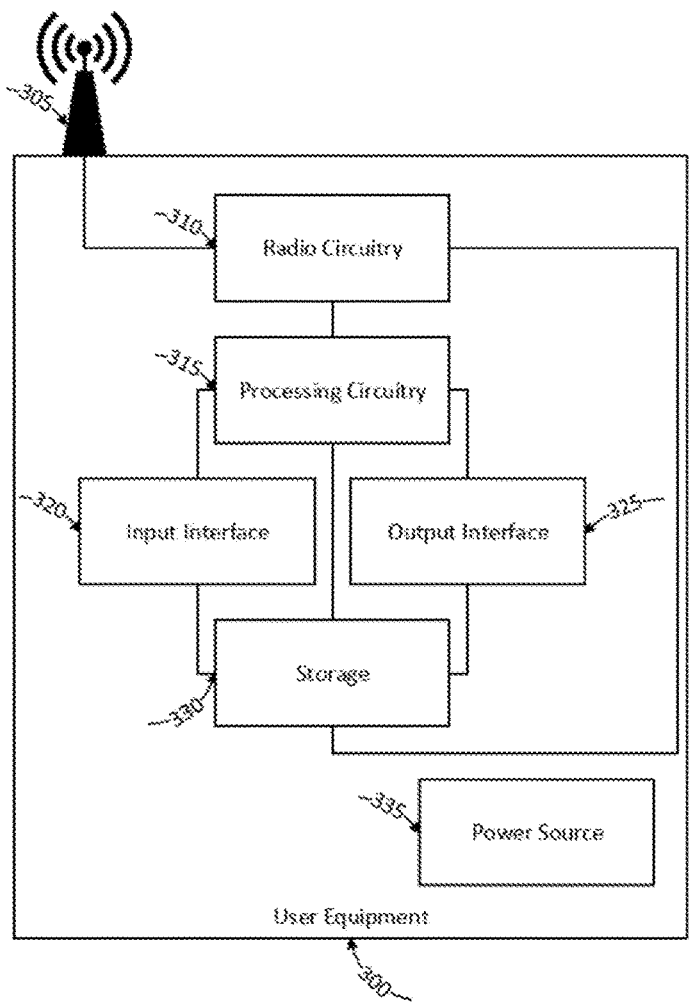
FIG. 6 is a block schematic of an exemplary wireless device, in accordance with certain embodiments.

As shown in FIG. 6, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 6 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 7:
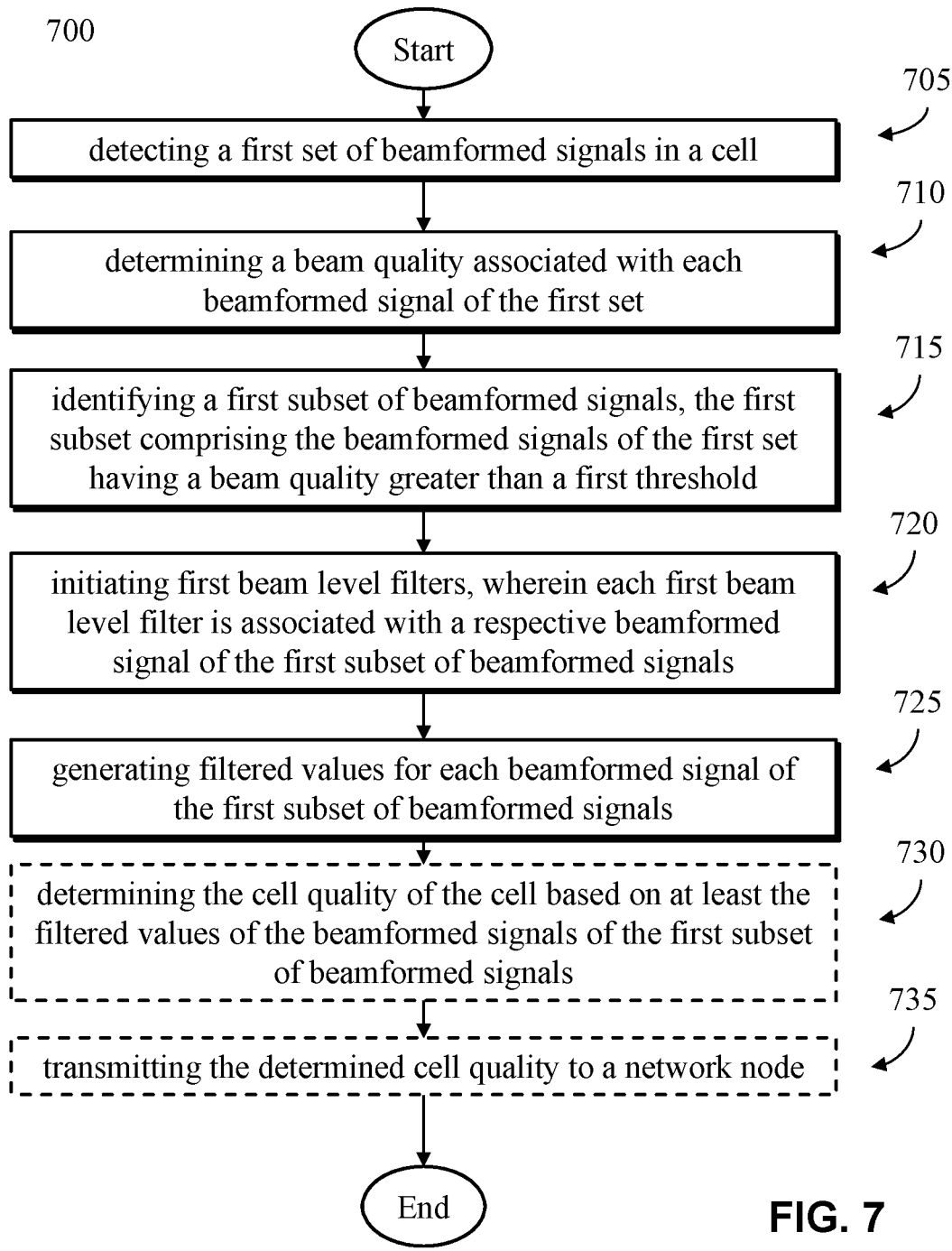
FIGS. 7-8 are flow diagrams, each illustrating an example method in a wireless device, in accordance with certain embodiments.

FIG. 7 is a flow diagram illustrating an example method 700 in a wireless device, such as wireless device 210, 300, in accordance with certain embodiments. Method 700 may begin at step 705 where the wireless device detects a first set of beamformed signals in a cell. For example, the wireless device may make periodic detections of beamformed signals in the cell. Once detected, the wireless device may make certain measurements or determinations of the beamformed signals. At step 710, the wireless device may determine beam quality associated with each beamformed signal of the first set. For example, the wireless device may determine the reference signal received power or quality for each of the beamformed signals.

Based on the determined qualities of the beamformed signals determined in step 710, the wireless device may identify a first subset of the first set of beamformed signals. For example, at step 715, the wireless device may identify the first subset of beamformed signals, where the first subset comprises the beamformed signals of the first set having a beam quality greater than a first threshold. In some embodiments, the wireless device may compare the beam quality of each of the signals in the first set to a predetermined threshold and only keep those signals above the threshold. In some embodiments, the threshold is zero or a null value. For example, in certain embodiments, the wireless device does not discard any detected beams unless the number of detected beams exceeds the number of available beam filters. In some embodiments, the threshold is non-zero. For example, the wireless device may discard certain signals as below the threshold and not use beam-level filter resources for those beams.

At step 720, first beam level filters may be initiated. Each first beam level filter is associated with a respective beamformed signal of the first subset of beamformed signals. For example, if a beam is in the first subset of beamformed signals and was not being tracked by the wireless device, the wireless device may associate that beam with an unallocated beam filter and begin tracking the beam. As another example, if a beam is in the first subset of beamformed signals and was being tracked, the beam may have already had associated with it a beam level filter. In such cases, the wireless device may continue to associate that beam level filter with the beam.

At step 725, the wireless device generates filtered values for each beamformed signal of the first subset of beamformed signals. For example, the wireless device may use the associated beam level filters to generate filtered values for each of the detected beams. These filtered values may be used by the wireless device in determining the cell quality of the cell. \

In certain embodiments, method 700 may include additional steps, such as optional steps 730 and/or 735. In some embodiments, the wireless device, at step 730, may determine the cell quality of the cell based on at least the filtered values of the beamformed signals of the first subset of beamformed signals. For example, the wireless device may use one or more of the filtered values in determining the cell quality. In some embodiments, the wireless device may combine the filtered values of the first subset with filtered values of other beamformed signals, such as the signals from the same beams at another instant in time. In some embodiments, the wireless device may rank the filtered values of the first subset in determining which filtered values to use in determining the cell quality. For example, there may be a maximum number of filtered values the wireless device will use in determining the cell quality. As a specific example, the wireless device may use a maximum of 2, 3, 4, 5, 6, 7, etc. beams to determine the cell quality. In some embodiments, the wireless device may rank the filtered values to determine which beams to use in the cell quality derivation. In this manner, the wireless device may determine and accurate cell quality using beam-level measurements.

In certain embodiments, method 700 further includes the wireless device transmitting the determined cell quality to a network node, such as network node 200. For example, at step 735, the wireless device may transmit the determined cell quality, determined in step 730, to a network node. In this manner, the network node (and thus, the network serving the wireless device), may receive information indicating the cell quality at a particular wireless device. The network and/or network node may use this information to enable or inform features such as radio link monitoring, mobility, CA configuration, power control and link adaptation. The wireless device may repeat any of the steps in FIG. 7. For example, the wireless device may periodically update the determined cell quality by continuing to detect beamformed signals in the cell.

Figure 8:
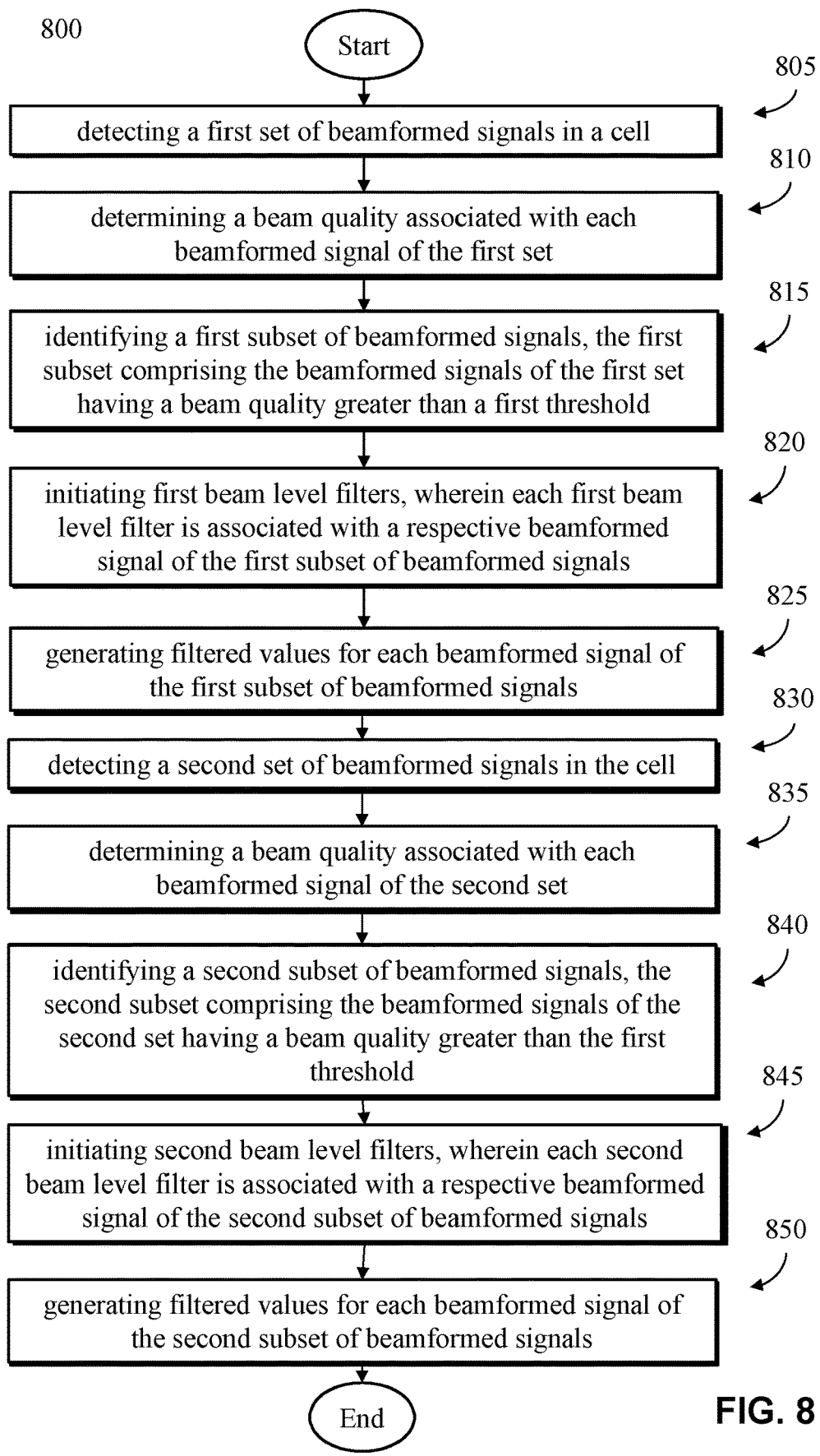

FIG. 8 is a flow diagram illustrating an example method 800 in a wireless device, such as wireless device 210, 300, in accordance with certain embodiments. Steps 805-825 may correspond to steps 705-725 described above in reference to FIG. 7. At step 830, the wireless device may detect a second set of beamformed signals in the cell. For example, the wireless device may take a snapshot of detected beams in the cell at a later time than the first set of beamformed signals.

Similar to step 710 or 810, at step 835, a beam quality associated with each beamformed signal of the second set may be determined by the wireless device. In some embodiments, a beam may be present in both the first set of beamformed signals and the second set of beamformed signals. The wireless device may determine a same or a different beam quality depending on the beam quality at the particular instance when the wireless device is detecting the beam for the second time. For example, the wireless device may have moved in the interim or the network environment may have changed. In this manner, the second set of beamformed signals may represent a more current or later-in-time snapshot of the cell, as seen at the wireless device.

At step 840, the wireless device may identify a second subset of beamformed signals. The second subset includes the beamformed signals of the second set having a beam quality greater than the first threshold. Similar to steps 715 and 815, the wireless device may keep all or only some of the detected beamformed signals for further use in deriving the cell quality.

At step 845, the wireless device may initiate second beam level filters, wherein each second beam level filter is associated with a respective beamformed signal of the second subset of beamformed signals. The second beam level filters may be the same or may include different, additional, or less, beam level filters than the first beam level filters. For example, if beams are present in both the first subset and the second subset of beamformed signals, then previously initiated first beam level filters for those beams may be maintained or reinitiated for those beams. If a beam is present in the second subset of the beamformed signals, but not in the first subset, then a new or additional beam level filter may be initiated for that beam. If a beam is not present in the second subset, but was present in the first subset, the wireless device may choose whether to maintain or reinitiate the first beam level filter for that beam. For example, the wireless device may disassociate the first beam level filter associated with the beam because the beam is no longer present or is below a certain threshold quality or power in the second set of beamformed signals. As another example, the wireless device may maintain the first beam level filter for that beam despite the beam not being present in a subsequent set of detected or identified beams.

At step 850, the wireless device may generate filtered values for each beamformed signal of the second subset of beamformed signals. For example, the wireless device may use the initiated second beam level filters to determine filtered values for the beams in the second subset of beamformed signals. In some embodiments, the filtered values are also based on previous filtered values of the beams. For example, the filtered values for the beams of the second subset of beamformed signals may be based, in part, by the filtered values of the associated beamformed signal of the beam in the first subset. In this manner, the filtered values may represent a type of rolling average, incorporating previously filtered values.

In certain embodiments, method 800 comprises the wireless device determining the cell quality of the cell based on the generated filtered values, including the filtered values of the first subset and the second subset of beamformed signals. For example, in certain embodiments, determining the cell quality of the cell is based on the filtered values of the beamformed signals of the second subset of beamformed signals in addition to the filtered values of the beamformed signals of the first set of beamformed signals. In certain embodiments, method 800 further comprises the wireless device transmitting the cell quality to a network node.

In certain embodiments, initiating first beam level filters comprises initiating a number of beam level filters equal to or less than a predetermined maximum number of beams to derive a cell quality for the cell. For example, if N is the maximum number of beams for deriving cell quality, then the wireless device may only initiate N or less beam level filters. In some embodiments, if a number of beamformed signals in the first subset is greater than or equal to a predetermined number of beam level filters necessary to derive a cell quality for the cell, the wireless device initiates a number of beam level filters equal to the predetermined number of beam level filters. For example, the wireless device may discard one or more of the beamformed signals in the first subset of beamformed signals before allocating beam level filters. This may be based on a ranking by the wireless device or some other criteria for choosing only certain ones of the beamformed signals in the first subset of beamformed signals. If a number of beamformed signals in the first subset is less than the maximum number, the wireless device may then initiate beam level filters for each of the beamformed signals in the first subset.

In certain embodiments, methods 700 and/or 800 further comprise ranking the first set and or second set of beamformed signals. For example, if the number of beamformed signals in one of the detected sets of beamforms signals exceeds a maximum number of beams to be used in deriving cell quality of the cell, then the wireless device may rank the beamformed signals, e.g., according to power or quality, and only use the top X number of beamformed signals in deriving cell quality. In some embodiments, ranking the beamformed signals comprises determining a beam quality of each beamformed signal and ordering the first set of beamformed signals based on the respective beam qualities. For example, the beamformed signals may be ranked from best beam quality to worst beam quality. In some embodiments, the beamformed signals with a beam quality below a certain threshold may be discarded, even if it would result in a lesser number of retained beamformed signals than the maximum number of beams to use in deriving the cell quality.

In certain embodiments, the wireless device ranks the filtered values of the first and/or second subset of beamformed signals. For example, the wireless device may allocate beam level filters to a number of beams that is greater than the maximum number of beams to derive the cell quality. For example, the wireless device may maintain K number of beam level filters for a cell, but only use N<K number of beams for deriving the cell quality. In this manner, the wireless device may track more beams over time, which may increase the accuracy of the cell quality derived.

In certain embodiments, methods 700 and/or 80 may include the additional steps of determining that a first beamformed signal contained within the first set is not present in the second set and assigning a predetermined quality value to the first beamformed signal. For example, if a beam is present in the first set, but is not detected in the second set, the wireless device may assign the lower possible value, e.g., zero or a null value, to that beamformed signal for the time at which the second set of beamformed signals was detected. In this manner, even if a beam is not present at a particular detection instance, it may later be detected and used for determining the cell quality. The predetermined quality value may be used to properly account for the beam not being present. For example, if a beam is present in only every other set of beamformed signals detected at the wireless device even if it has a high beam quality when it is detected, it lowers the derived cell quality because, it is only present half of the time. In this manner, the wireless device may account for missing or undetected beams for deriving quality using beam level measurements.

In certain embodiments, weighting factors may be applied to each of the generated filtered values. For example, a weighting factor may be applied to each of the generated filtered values for each beamformed signal of the first subset of beamformed signals. If the beamformed signals in the first subset are associated with a time, e.g., a snapshot at a particular instance, then the same weighting factor may be applied to each of the beamformed signals of the first subset.

In some embodiments, a weighting factor may be applied to the second subset of beamformed signals. The weighting factor applied to the second subset may be the same or different or the same as the first subset. For example, if the second subset is a subset of beamformed signals that are more recent in time, then a higher weighting factor may be applied to the beamformed signals of the second subset than those of the first subset. Thus, in some embodiments, applying a weighting factor to each of the generated filtered values comprises applying a larger weighting factor for more recent beamformed signals. In this manner, the cell quality derivation may be more influenced by more recent values. The exact weighting factors may be based on one or more factors, such as the time between subsequent beamformed signals of the beams, the mobility of the wireless device, the type of wireless device, etc.

In certain embodiments, the steps of method 700 and/or method 800 may be repeated any number of times before a cell quality is derived. For example, a number of sets of beamformed signals may be detected during a predetermined period of time, e.g., 40 ms, and the steps of the methods may be applied to each set of beamformed signals. The resulting filtered values may be used to derive the cell quality, which may be transmitted to a network node. In this manner, an accurate cell quality may be provided using beam level measurements.

Figure 9:
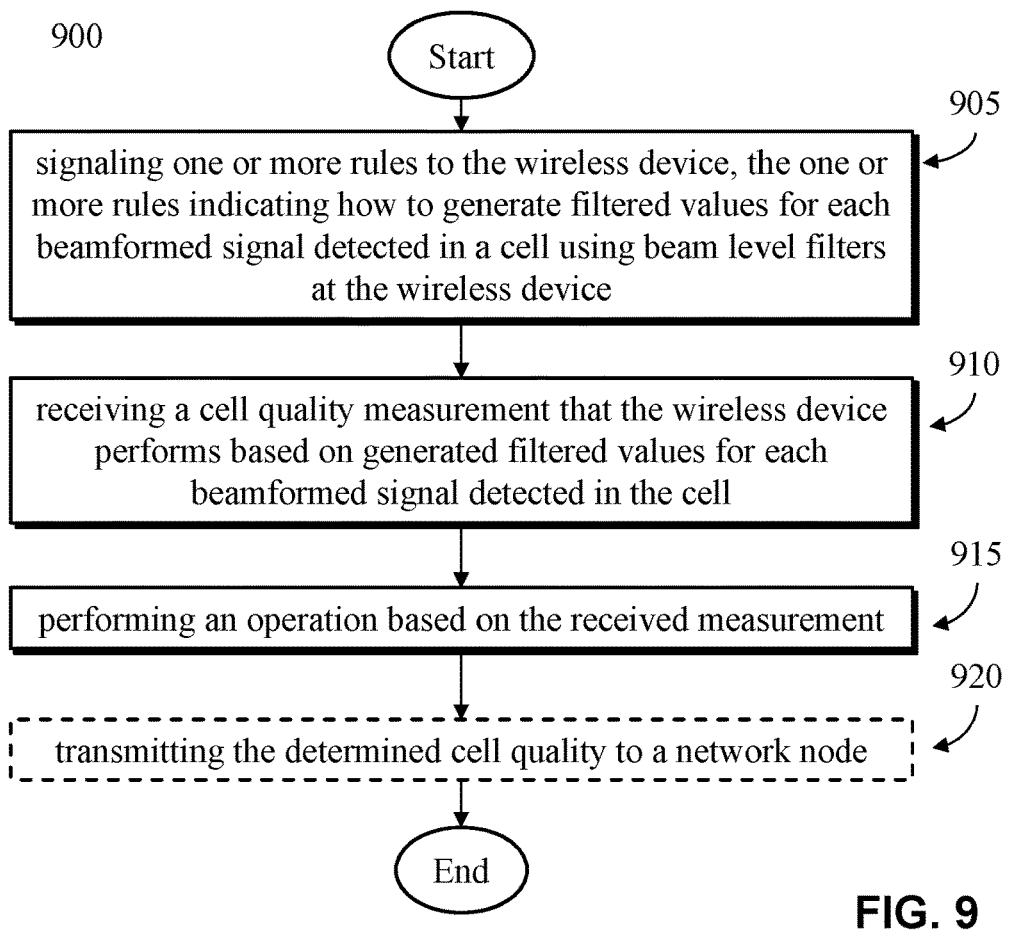
FIG. 9 is a flow diagram of a method in a network node, in accordance with certain embodiments.

FIG. 9 is a flow diagram illustrating an example method 900 in a network node, such as network node 200, in accordance with certain embodiments. At step 905, the network node may signal one or more rules to a communicatively coupled wireless device, such as wireless device 210, 300. The one or more rules may indicate how to generate filtered values for each beamformed signals detected in the cell using beam level filters at the wireless device. For example, the one or more rules may indicate one or more thresholds to use at the wireless device to determine whether to use certain beamformed signals in deriving cell quality. As another example, the one or more rules may indicate how the wireless device allocates its beam level filters, such as a maximum number of filters to use to derive a certain cell's cell quality.

At step 920, the network node may receive a cell quality measurement that the wireless device performs based on generated filtered values for each beamformed signal detected in the cell. For example, the network node may receive a cell quality measurement based on one or more of the steps described above with reference to FIGS. 7 and 8.

At step 930, the network node may perform an operation based on the received measurement. For example, the network node, alone or with other network elements, may adjust one or more settings, parameters controlling the communications with wireless device or may control one or more features of the wireless device and/or the network such as radio link monitoring, mobility, CA configuration, power control and link adaptation. In this manner, the network node may use the cell quality derived from beam level measurements at the wireless device to enhance the capability and performance of the network and/or the wireless device. Method 900 may include one or more additional steps. For example, at optional step 920, the network node may obtain information of the beam-level filtering capabilities available at the wireless device. For example, the network node may obtain information about the number of beam level filters available at the wireless device for beam level measurements for cell quality derivation. In some embodiments, the one or more rules signaled to the wireless device are based on the obtained information. For example, the network node may adjust certain thresholds or numbers of beams to use in cell quality derivation based on the obtained capability information. In this manner, the network may tailor the cell quality derivation based on beam level measurements to the capabilities of the particular wireless device.

In certain embodiments, the one or more rules signaled to the wireless device are based on the beamform signals being transmitted in the cell. For example, the network node may have information regarding the beams transmitted within a cell serving wireless device. This information may inform the rules sent to the wireless device. For example, it may be used in determining thresholds to be used in the wireless device to discard beamformed signals and/or in determining the number of beams to use in deriving cell quality of the cell.

In certain embodiments, the one or more rules are configured to cause the wireless device to perform any the functions described above with reference to FIGS. 7 and 8.

In certain embodiments, the methods described in FIGS. 7-8 may be performed by wireless device 210, 300 of FIGS. 5 and 6. For example, processing circuitry 315 can be configured to cause wireless device 210, 300 to carry out the steps of any of method 700 or method 800. In certain embodiments, the method described in FIG. 9 may be performed by network node 200 illustrated in FIG. 6. For example, processing circuitry 202 can be configured to cause network node 200 to carry out the steps of method 200.

Figure 10:
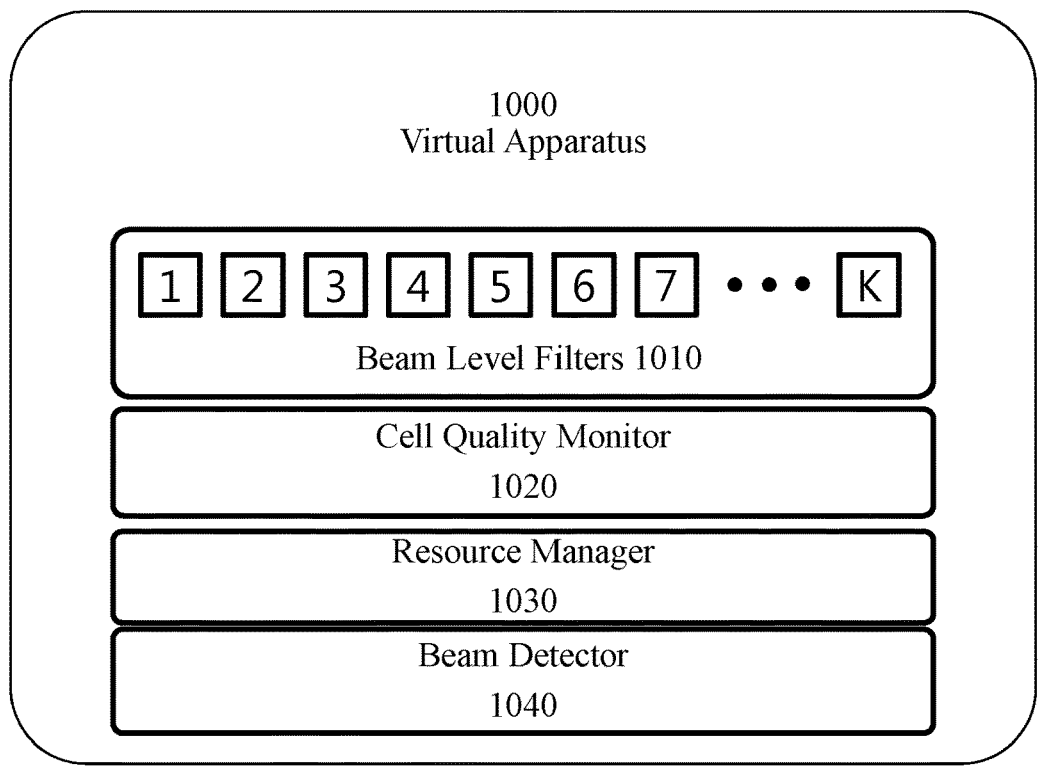
FIG. 10 illustrates a virtualized apparatus of a wireless device with one or more modules, in accordance with certain embodiments.

FIG. 10 is a schematic block diagram of an example virtual apparatus 1000 of a wireless device including one or more modules. Virtual apparatus 1000 may be implemented in a wireless device or network node (e.g., wireless device 210, 300 or network node 200). Apparatus 1000 is operable to carry out the example methods described with reference to FIGS. 7 and 8 and possibly any other processes or methods disclosed herein. It is also to be understood that the methods of FIGS. 7 and 8 are not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Beam Level Filters 1010, Cell Quality Monitor 1020, Resource Manager 1030, Beam Detector 1040, and any other suitable units of apparatus 1000 to perform corresponding functions according one or more embodiments of the present disclosure.

As illustrated in FIG. 10, apparatus 1000 includes Beam Level Filters 1010, Cell Quality Monitor 1020, Resource Manager 1030, and Beam Detector 1040. In certain embodiments, beam detector 1040 detects one or more beams in a cell. For example, beam detected 1040 may include one or more transceiver components capable of detecting and/or measuring beamformed signals. Resource Manager 1030 allocates filters to a subset of the detected beams. For example, Resource Manager 1030 may determine which beams should be allocated a beam level filter for tracking the chosen beams over time to derive a cell quality. The Beam Level Filters 1010 may receive respective detected beams and filter the beamformed signals of those beams to determine a filtered value of the beam. The filtered value may represent the quality, power, or other characteristic of the respective beam that may be used to derive the cell quality. Cell Quality Monitor 1020 determines the cell quality based on the filtered values from beam level filters 1010 and reports the cell quality to the network. For example, Cell Quality Monitor 1020 may determine a weighted average of beamformed signals from one or more beams in a cell to derive a cell quality value. In this manner, virtual apparatus 1000 may implement one or more embodiments described herein to derive the quality of a cell serving the wireless device from beam-level measurements.

ADDITIONAL EMBODIMENTS

A. A method for deriving cell quality based on filtered beam measurements comprising:
  detecting a first number of beams;
  determining a beam quality associated with each of the first number of beams;
  identifying a second number of beams having a beam quality greater than a first threshold, the second number of beams less than or equal to the first number of beams;
  initiating the second number of beam level filters, each beam level filter associated with one of the identified second number of beams; and
  generating the second number of filtered values.
B. The method of A, further comprising:
  detecting a third number of beams;
  determining a beam quality associated with each of the third number of beams;
  identifying a fourth number of beams having a beam quality generate than a first threshold;
  initiating the fourth number of beam level filters, each beam level filter associated with one of the identified fourth number of beams; and
  generating the second number of filtered values.
C. The method of B, wherein the third number of beams is more than the first number of beams.
D. The method of C, wherein the second fourth number is equal to the third number.
E. The method of B, wherein the third number of beams is less than the first number of beams and greater than or equal to the second number of beams.
F. The method of B, wherein the third number of beams is less than the first number of beams and the second number of beams.
G. The method of F, wherein generating the second number of filtered values comprises generating the third number of filtered values.
H. The method of B, wherein the third number of beams is equal to the first number of beams.
I. The method of H, wherein each beam has an identifier associated with it, and at least one identifier from the first number of beams is not among the third number of identifiers.
J. The method of A, further comprising ranking the first number of beams.
K. A UE comprising radio circuitry and processing circuitry, the UE configured to perform any of the steps in the above embodiments.
L. A wireless communication system comprising one or more network nodes configured to provide one or more beams and the UE of the above embodiment.
M. A UE comprising a plurality of modules configured to perform any of the steps in the above embodiments.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for deriving cell quality based on filtered beam measurements comprising:
  detecting a first set of beamformed signals in a cell;
  determining a beam quality associated with each beamformed signal of the first set;
  identifying a first subset of beamformed signals, the first subset comprising the beamformed signals of the first set having a beam quality greater than a first threshold;
  initiating first beam level filters, wherein each first beam level filter is associated with a respective beamformed signal of the first subset of beamformed signals; and generating filtered values for each beamformed signal of the first subset of beamformed signals;

detecting a second set of beamformed signals in the cell;

determining a beam quality associated with each beamformed signal of the second set;

identifying a second subset of beamformed signals, the second subset comprising the beamformed signals of the second set having a beam quality greater than the first threshold;

initiating second beam level filters, wherein each second each beam level filter is associated with a respective beamformed signal of the second subset of beamformed signals;

generating filtered values for each beamformed signal of the second subset of beamformed signals; and determining the cell quality of the cell based on at least the filtered values of the beamformed signals of the first subset of beamformed signals.

2. The method of claim 1, wherein initiating first beam level filters comprises initiating a number of beam level filters equal to or less than a predetermined maximum number of beams to derive a cell quality for the cell.

3. The method of claim 1, wherein determining the cell quality of the cell is further based on the filtered values of the beamformed signals of the second subset of beamformed signals.

4. The method of claim 1, further comprising:
ranking the first set of beamformed signals, wherein ranking the first set of beamformed signals comprises:
determining a beam quality of each beamformed signal of the first set of beamformed signals; and
ordering the first set of beamformed signals based on the respective beam qualities; and
ranking the second set of beamformed signals, wherein ranking the second set of beamformed signals comprises:
determining a beam quality of each beamformed signal of the second set of beamformed signals; and
ordering the second set of beamformed signals based on the respective beam qualities.

5. The method of claim 1, further comprising:
determining that a first beamformed signal contained within the first set is not present in the second set; and
assigning a predetermined quality value to the first beamformed signal.

6. The method of claim 1, wherein generating filtered values for each beamformed signal of the first subset of beamformed signals comprises applying a weighting factor to each of the generated filtered values;
and wherein generating filtered values for each beamformed signal of the second subset of beamformed signals comprises applying a weighting factor to each of the generated filtered values.

7. The method of claim 6, wherein applying a weighting factor to each of the generated filtered values comprises applying a larger weighting factor for more recent beamformed signals.

8. The method of claim 6, wherein:
the second set of beamformed signals are detected after the first set of beamformed signals; and
larger weighting factors are applied to the generated filtered values for each beamformed signal of the second subset of beamformed signals than the respective weighting factors applied to the generated filtered values for each beamformed signal of the first subset of beamformed signals.

9. A wireless device, comprising:
one or more interfaces;
memory; and
processing circuitry configured to execute instructions stored in the memory, whereby the wireless device is configured to:
detect a first set of beamformed signals in a cell;
determine a beam quality associated with each beamformed signal of the first set;
identify a first subset of beamformed signals, the first subset comprising the beamformed signals of the first set having a beam quality greater than a first threshold;
initiate first beam level filters, wherein each first beam level filter is associated with a respective beamformed signal of the first subset of beamformed signals; and
generate filtered values for each beamformed signal of the first subset of beamformed signals;
detect a second set of beamformed signals in the cell;
determine a beam quality associated with each beamformed signal of the second set;
identify a second subset of beamformed signals, the second subset comprising the beamformed signals of the second set having a beam quality greater than the first threshold;
initiate second beam level filters, wherein each second beam level filter is associated with a respective beamformed signal of the second subset of beamformed signals;
generate filtered values for each beamformed signal of the second subset of beamformed signals; and
determine the cell quality of the cell based on at least the filtered values of the beamformed signals of the first subset of beamformed signals.

10. The wireless device of claim 9, a number of the initiated first beam level filters is less than a predetermined maximum number of beams to derive a cell quality for the cell.

11. The wireless device of claim 9, wherein the cell quality of the cell is determined based on the filtered values of the beamformed signals of the second subset of beamformed signals.

12. The wireless device of claim 9, wherein the wireless device is further configured to:
rank the first set of beamformed signals, wherein tho rank the first set of beamformed signals, the wireless device is further configured to:
determine a beam quality of each beamformed signal of the first set of beamformed signals; and
order the first set of beamformed signals based on the respective beam qualities; and
rank the second set of beamformed signals, wherein to rank the second set of beamformed signals the wireless device is further configured to:
determine a beam quality of each beamformed signal of the second set of beamformed signals; and
order the second set of beamformed signals based on the respective beam qualities.

13. The wireless device of claim 9, wherein the wireless device is further configured to:
determine that a first beamformed signal contained within the first set is not present in the second set; and
assign a predetermined quality value to the first beamformed signal.

14. The wireless device of claim 9, wherein the wireless device configured to generate filtered values for each beamformed signal of the first subset of beamformed signals comprises applying a weighting factor to each of the generated filtered values, and wherein the wireless device configured to generate filtered values for each beamformed signal of the second subset of beamformed signals comprises applying a weighting factor to each of the generated filtered values.

15. The wireless device of claim 14, wherein the wireless device configured to apply a weighting factor to each of the generated filtered values comprises applying a larger weighting factor for more recent beamformed signals.

16. The wireless device of claim 14, wherein:

the second set of beamformed signals are detected after the first set of beamformed signals; and larger weighting factors are applied to the generated filtered values for each beamformed signal of the second subset of beamformed signals than the respective weighting factors applied to the generated filtered values for each beamformed signal of the first subset of beamformed signals.

17. A network node, comprising:
one or more interfaces;
memory; and
processing circuitry configured to execute instructions stored in the memory, whereby the network node is configured to:
obtain information of the beam-level filtering capabilities available at a wireless device, wherein one or more rules signaled to the wireless device are based on the obtained information;
signal the one or more rules to the wireless device, the one or more rules indicating how to generate filtered values for each beamformed signal detected in a cell using beam level filters at the wireless device;
receive a cell quality measurement that the wireless device performs based on generated filtered values for each beamformed signal detected in the cell; and
perform an operation based on the received measurement.

18. The network node of claim 17, wherein the one or more rules signaled to the wireless device are based on the beamform signals being transmitted in the cell.

* * * * *